UNITED STATES PATENT OFFICE 2,297,034

PROCESS OF CRYSTALLIZING UREA

Anton Strzyzewski and Hans Joachim Froehlich, Leuna, Germany; vested in the Alien Property Custodian No Drawing. Application August 3, 1939, Serial No. 288,140. In Germany August 27, 1938

3 Claims. (Cl. 260—555)

The present invention relates to improvements in the production of urea by crystallizing it from aqueous solutions.

Urea when manufactured according to the known processes, tends to agglomerate when stored, irrespective of whether it is urea of needle-shaped crystal form crystallized out from solutions or whether it is so-called "sprayed" urea solidified from a fused mass.

We have now found that urea which is well capable of being stored and strewed can be obtained in a simple manner by carrying out the crystallization of the urea in aqueous urea solutions which are strongly saturated with ammonium chloride. The ammonium chloride content of the urea solution preferably amounts to at least about 80 per cent of the ammonium chloride amount necessary for a complete saturation. The presence of ammonium chloride in the solution to be caused to crystallize effects considerable change in the crystal form of the urea crystallized out. Whereas the urea from aqueous solutions usually crystallizes in long pointed needles, short compact crystals are formed in the presence of ammonium chloride. These, contrasted with the usual needle-shaped crystals, have a considerably increased capacity for being stored and strewed.

It has been found advantageous to keep the ammonium chloride content of the urea solution substantially constant during the crystallization. This may be effected for example by dividing a solution which is saturated with ammonium chloride and, if desired, with urea, saturating a part thereof with urea at a higher temperature and allowing this warmer solution to flow into the other part of the solution while maintaining the original temperature. Alteration in the speed of flowing in merely alters the size of the precipitated crystals, but not their shape. The temperatures selected for the saturation and crystallisation are unimportant for the result of the process. Generally speaking, the chloride content of the centrifuged urea amounts to only 0.1 to 0.2 per cent after the washing out with urea solution.

The following example will further illustrate the nature of this invention but the invention is not restricted to this example.

*Example*

A solution saturated with urea at 20° C. and containing 52.4 per cent of urea, 12.4 per cent of ammonium chloride and 35 per cent of water is divided. The ammonium content of the solution corresponds to 93 per cent of a complete saturation with respect to ammonium chloride. A part of the solution is saturated with urea at 50° C. and then contains 65.5 per cent of urea, 8.9 per cent of ammonium chloride and 25 per cent of water. This solution is allowed to flow into the remainder of the original solution while stirring and maintaining the temperature of 20° C. The urea crystallizes in short compact crystals.

Instead of the above-mentioned temperatures, it is also possible to work at crystallization temperatures of 0° or 30° C. and saturation temperatures of 20° or 60° C.; in all cases short compact crystals are obtained.

What we claim is:

1. A process for the production of practically pure urea which comprises crystallizing the urea from a solution consisting of urea, water and ammonium chloride, substantially saturated with urea and ammonium chloride at the crystallizing temperature and maintaining the ammonium chloride content of said solution substantially constant during crytallization.

2. The process as defined in claim 1, wherein the amount of ammonium chloride in said solution is at least about 80% of the amount necessary for complete saturation.

3. A process for the production of practically pure urea which comprises dividing into two parts a solution consisting of water, urea and ammonium chloride and which is substantially saturated with ammonium chloride, saturating one part thereof with urea at a temperature higher than that at which the division occurs and effecting crystallization by flowing the warmer solution into the other while maintaining the temperature of division, the amount of urea in the solution being such that saturation of the mixed solution occurs at the temperature of crystallization.

ANTON STRZYZEWSKI.
HANS JOACHIM FROEHLICH.